Patented June 27, 1939

2,163,834

UNITED STATES PATENT OFFICE 2,163,834

DENATURED ALCOHOL CONTAINING DIBENZYLAMINE

Louis J. Figg, Jr., Kingsport, Tenn., assignor to Eastman Kodak Company, Rochester, N. Y., a corporation of New Jersey No Drawing. Application October 14, 1937, Serial No. 168,973

1 Claim. (Cl. 202—77)

This invention relates to the denaturing of ethyl alcohol, and to alcohol so denatured.

It is an object of my invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. Other objects will hereinafter appear.

I have discovered that dibenzylamine is an effective denaturant for alcohol. In denaturing ethyl alcohol with my novel denaturant, I may use from 0.5 to 5 parts of the amine, or even more, per 100 parts of 95% alcohol. Dibenzylamine may be used alone in denaturing, or it may be used in conjunction with chloroform, or with lower aliphatic ketones, or with any other denaturants with which it may be found to be compatible. When dibenzylamine is used with chloroform, I prefer to use approximately equal parts of chloroform and the amine. From 0.5 to 5 parts, or even more, of the combination may be used per 100 parts of 95% alcohol.

What I claim as my invention and desire to be secured by Letters Patent of the United States is:

Denatured ethyl alcohol containing, as an essential denaturing element, from 0.5 to 5 parts, approximately, of dibenzylamine per 100 parts of 95% alcohol.

LOUIS J. FIGG, Jr.